US010001095B2

(12) United States Patent
Israelson et al.

(10) Patent No.: US 10,001,095 B2
(45) Date of Patent: Jun. 19, 2018

(54) RETAINER WITH GROUNDING FEATURE FOR FUEL SYSTEM COMPONENT

(71) Applicant: WALBRO ENGINE MANAGEMENT, L.L.C., Tucson, AZ (US)

(72) Inventors: Kevin L. Israelson, Cass City, MI (US); Douglas W. Salowitz, Jr., Palms, MI (US); David L. Speirs, Cass City, MI (US)

(73) Assignee: Walbro LLC, Tucson, AZ (US)

( * ) Notice: Subject to any disclaimer, the term of this patent is extended or adjusted under 35 U.S.C. 154(b) by 94 days.

(21) Appl. No.: 14/768,558

(22) PCT Filed: Mar. 7, 2014

(86) PCT No.: PCT/US2014/021528
§ 371 (c)(1),
(2) Date: Aug. 18, 2015

(87) PCT Pub. No.: WO2014/159021
PCT Pub. Date: Oct. 2, 2014

(65) Prior Publication Data
US 2016/0017850 A1 Jan. 21, 2016

Related U.S. Application Data

(60) Provisional application No. 61/777,256, filed on Mar. 12, 2013, provisional application No. 61/815,404, filed on Apr. 24, 2013.

(51) Int. Cl.
*B60K 15/03* (2006.01)
*F02M 37/00* (2006.01)
(Continued)

(52) U.S. Cl.
CPC ........ *F02M 37/08* (2013.01); *F02M 37/0011* (2013.01); *F02M 37/0029* (2013.01);
(Continued)

(58) Field of Classification Search
CPC ........ F02M 69/54; F02M 41/00; F02M 55/02; F02M 39/005; F02M 37/0029;
(Continued)

(56) References Cited

U.S. PATENT DOCUMENTS 4,494,520 A * 1/1985 Hurwitz ................ H01R 4/646
123/633
5,094,211 A 3/1992 Mahnke et al.
(Continued)

FOREIGN PATENT DOCUMENTS

KR 1020110105616 12/2011

OTHER PUBLICATIONS

Written Opinion & International Search Report for PCT/US2014/021528 dated Jun. 10, 2014, 12 pages.

*Primary Examiner* — Lindsay Low
*Assistant Examiner* — George Jin
(74) *Attorney, Agent, or Firm* — Reising Ethington P.C.

(57) ABSTRACT

In at least some implementations, a retainer for a fuel system component having an electrically conductive portion accessible from the exterior of the component includes a retaining feature and a grounding feature. The retaining feature is adapted to maintain the location of the fuel system component and the grounding feature electrically couples a ground wire to the electrically conductive portion of the fuel system component. The fuel system component is grounded through a path including the grounding feature and ground wire.

13 Claims, 10 Drawing Sheets

(51) Int. Cl.
*F02M 37/08* (2006.01)
*F02M 37/10* (2006.01)
*H02G 3/06* (2006.01)
*H01R 4/64* (2006.01)
*F02M 37/22* (2006.01)

(52) U.S. Cl.
CPC . *F02M 37/103* (2013.01); *B60K 2015/03217* (2013.01); *B60K 2015/03401* (2013.01); *F02M 2037/082* (2013.01); *F02M 2037/228* (2013.01); *H01R 4/643* (2013.01); *H01R 4/646* (2013.01); *H02G 3/0625* (2013.01)

(58) Field of Classification Search
CPC ............. F02M 37/103; F02M 37/0082; F02M 37/0011; F02M 37/08; F02M 2037/082; B60K 2015/03401; B60K 2015/03217; G01F 23/30; H01R 9/0512; H02G 3/0616; H02G 3/0625; H02G 3/643; H02G 3/065; H02G 3/0675; F16L 3/1233
See application file for complete search history.

(56) References Cited

U.S. PATENT DOCUMENTS

| | | | | |
|---|---|---|---|---|
| 5,433,241 A | | 7/1995 | Robinson | |
| 5,451,167 A | * | 9/1995 | Zielinski | H01R 4/646 439/435 |
| 5,636,306 A | * | 6/1997 | Mock | G02B 6/4416 385/100 |
| 5,873,349 A | | 2/1999 | Tuckey et al. | |
| 6,011,218 A | * | 1/2000 | Burek | G02B 6/4419 174/135 |
| 6,283,772 B1 | * | 9/2001 | Braun | F02M 55/00 123/470 |
| 6,547,515 B2 | | 4/2003 | Ross | |
| 7,278,401 B1 | * | 10/2007 | Cotton | F02M 69/54 123/457 |
| 7,318,422 B2 | * | 1/2008 | Douyama | F04B 17/03 123/495 |
| 7,635,816 B1 | * | 12/2009 | Shemtov | H02G 3/0666 16/2.2 |
| 9,217,403 B1 | * | 12/2015 | Cotton | G01F 23/30 |
| 2004/0011129 A1 | * | 1/2004 | Gilmour | B60K 15/00 73/313 |
| 2009/0139741 A1 | * | 6/2009 | Shimizu | H01R 4/64 174/51 |
| 2011/0036292 A1 | * | 2/2011 | Dehtiar | C23C 16/4418 118/723 E |
| 2012/0222718 A1 | * | 9/2012 | Sweeney | H01R 4/36 136/244 |
| 2012/0231645 A1 | * | 9/2012 | Byrne | H01R 4/48 439/215 |
| 2013/0189860 A1 | * | 7/2013 | Pyron | H01R 4/30 439/100 |
| 2013/0303833 A1 | * | 11/2013 | LaRose | A61M 1/101 600/16 |
| 2016/0087354 A1 | * | 3/2016 | Hanson | H01R 9/0503 439/98 |

* cited by examiner

RETAINER WITH GROUNDING FEATURE FOR FUEL SYSTEM COMPONENT

REFERENCE TO CO-PENDING APPLICATIONS

This application claims the benefit of U.S. Provisional Application Nos. 61/777,256 filed Mar. 12, 2013, and 61/815,404 filed Apr. 24, 2013 which are incorporated herein by reference in their entirety.

TECHNICAL FIELD

The present disclosure relates generally to a fuel pump assembly and a fuel system component retainer with an electrical grounding feature.

BACKGROUND

Fuel pump assemblies are used to pump fuel from a fuel tank to an engine to support operation of the engine. Such fuel pump assemblies include a fuel pump and often other components, like fuel level sensors and sometimes fuel pressure regulators. The fuel pump and other fuel system components mad be received within a fuel tank and there is sometimes a need to electrically ground such components.

SUMMARY

In at least some implementations, a retainer for a fuel system component having an electrically conductive portion accessible from the exterior of the component includes a retaining feature and a grounding feature. The retaining feature is adapted to maintain the location of the fuel system component and the grounding feature electrically couples a ground wire to the electrically conductive portion of the fuel system component. The fuel system component is grounded through a path including the grounding feature and ground wire.

A fuel pump assembly includes a housing having a pocket, a fuel pressure regulator carried by the housing and having a body with at least a portion of the body received in the pocket and at least a portion of the body being electrically conductive, and a retainer connected to the housing. The retainer holds the fuel pressure regulator in position relative to the housing and includes a grounding feature to couple a ground wire with the electrically conductive portion of the body.

BRIEF DESCRIPTION OF THE DRAWINGS

The following detailed description of preferred embodiments and best mode will be set forth with reference to the accompanying drawings, in which.

DETAILED DESCRIPTION OF PREFERRED EMBODIMENTS

Figure 1:
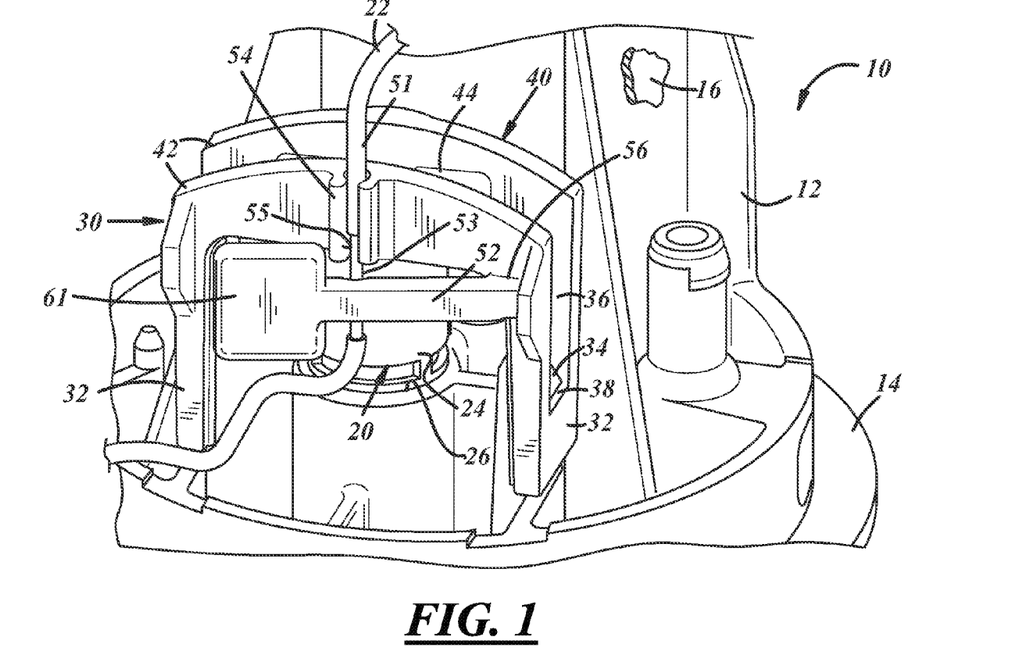
FIG. 1 is a fragmentary perspective view of a fuel pump assembly including a pressure regulator and showing a retainer for the pressure regulator in a partially installed position.
Figure 2:
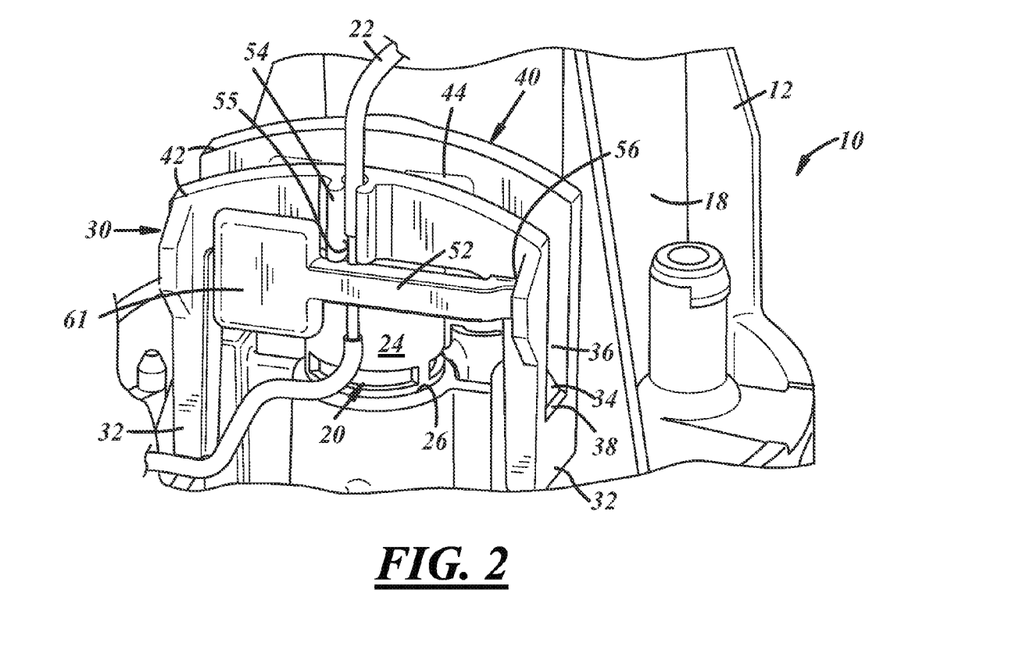
FIG. 2 is a view like FIG. 1 showing the retainer in its fully installed position.
Figure 3:
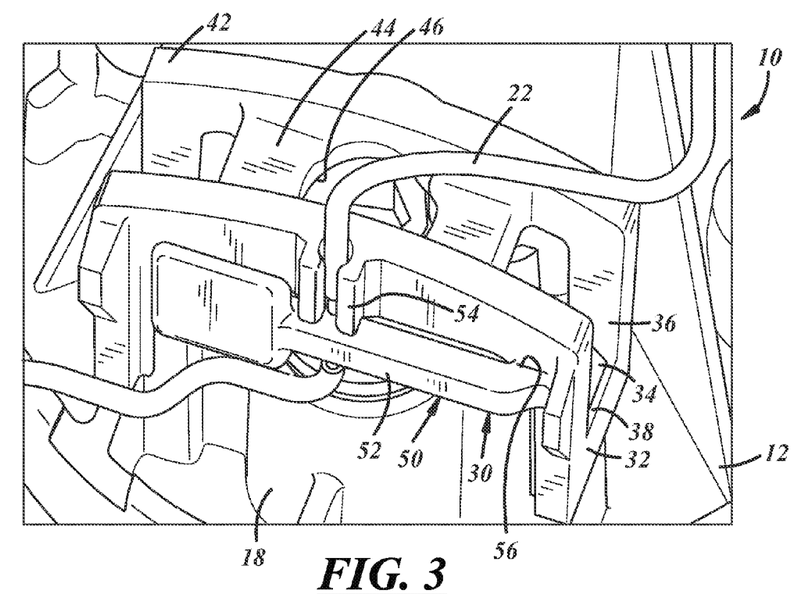
FIG. 3 is an enlarged fragmentary perspective view similar to FIG. 2 and illustrating a portion of the retainer and a grounding wire trapped between the retainer and the pressure regulator.
Figure 4:
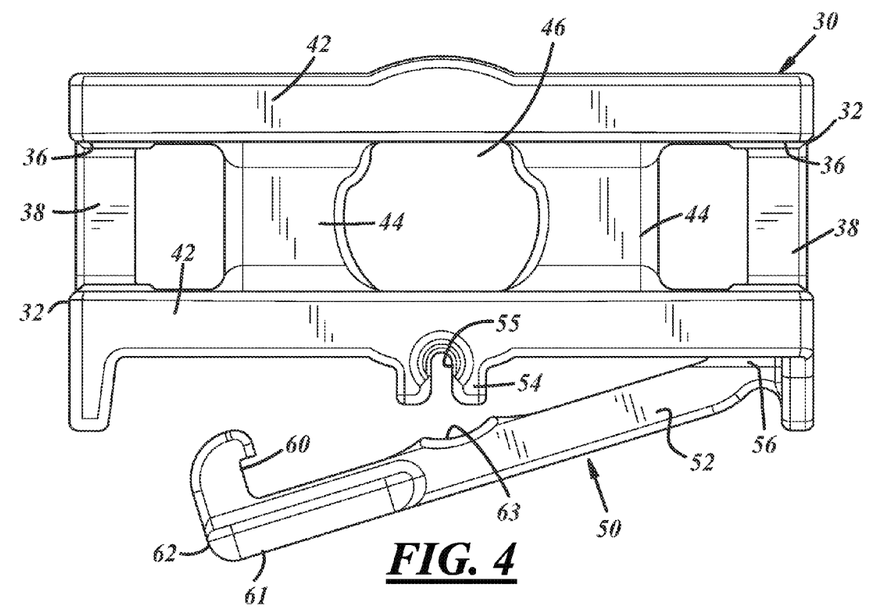
FIG. 4 is a top view of the retainer shown with a latch in an open position.
Figure 5:
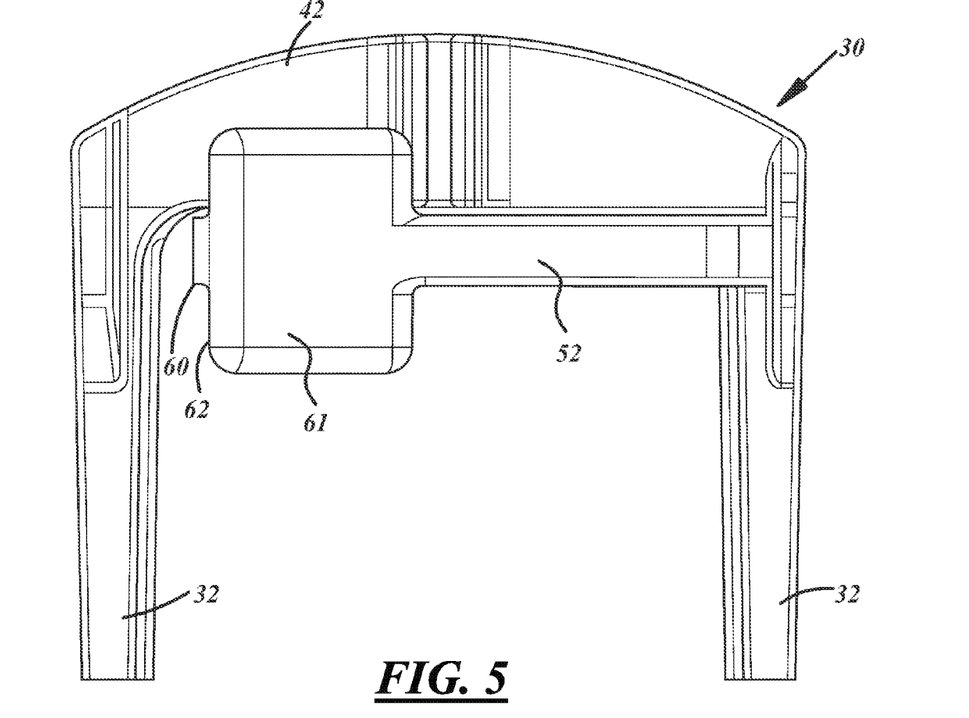
FIG. 5 is a front view of the retainer.
Figure 6:
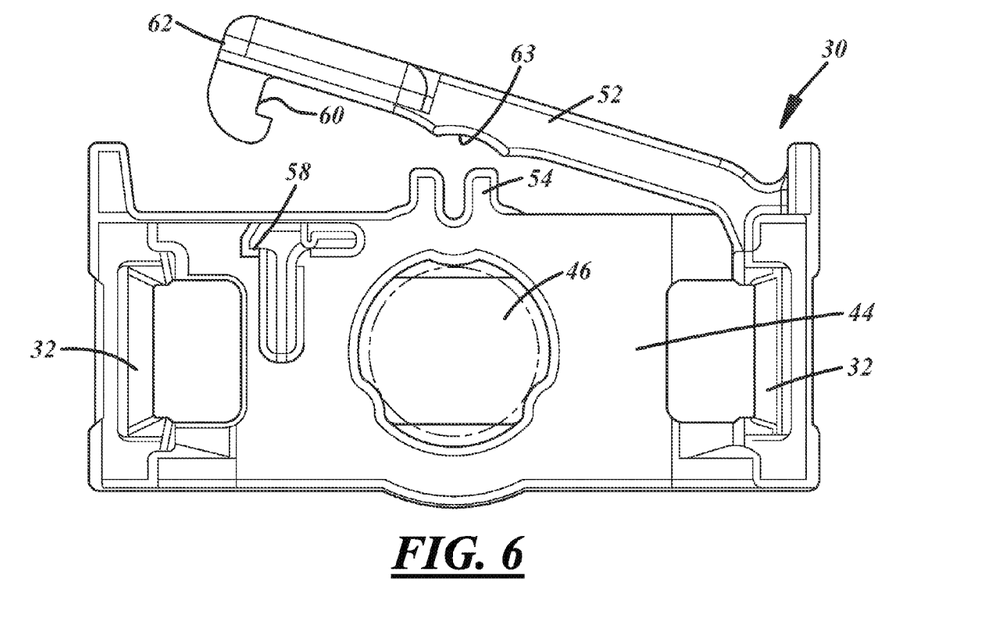
FIG. 6 is a bottom view of the retainer.
Figure 7:
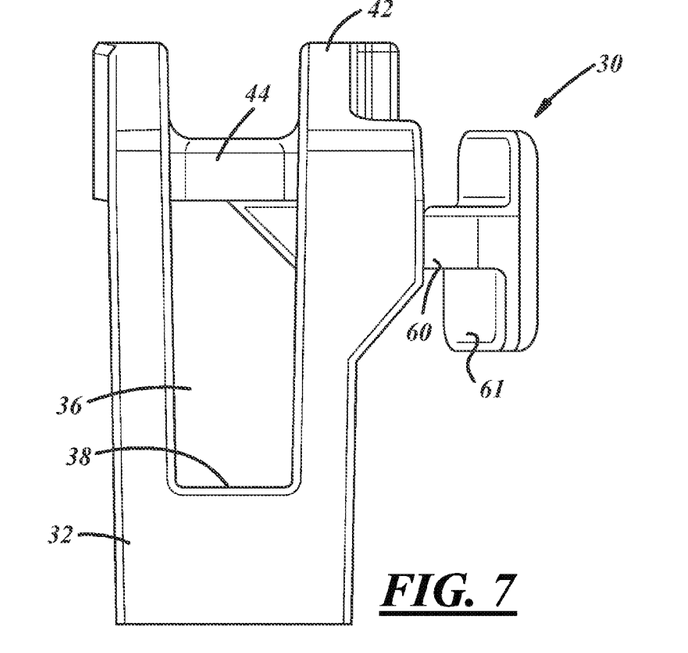
FIG. 7 is a side view of the retainer.
Figure 8:
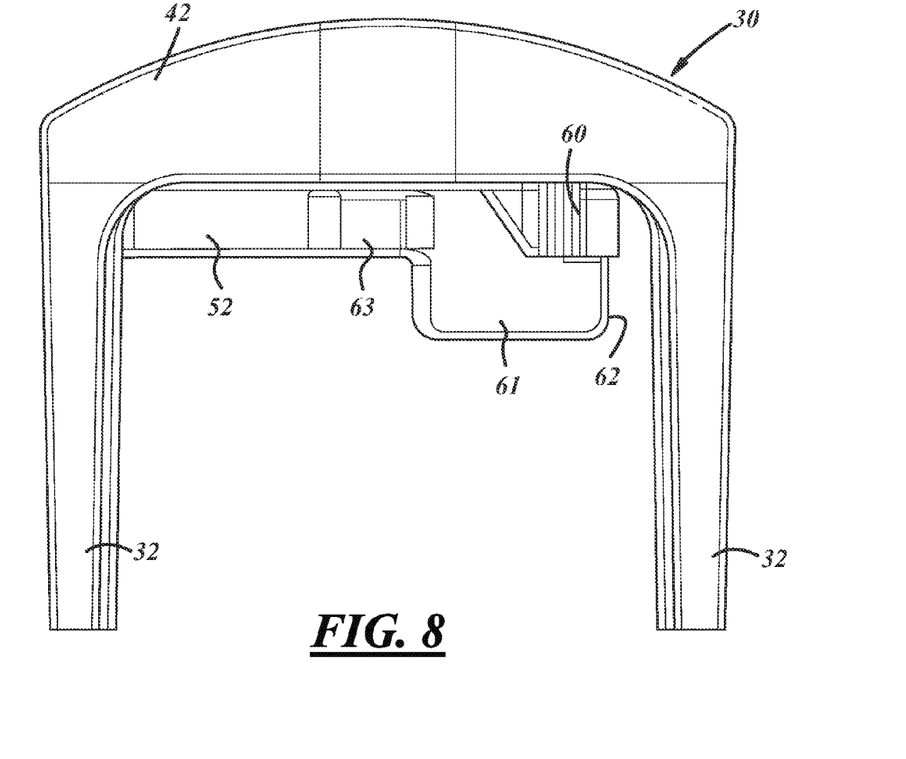
FIG. 8 is a rear view of the retainer.

Referring in more detail to the drawings, FIGS. 1-3 illustrate a portion of a fuel pump assembly 10 that may be used to pump fuel from a fuel tank (not shown) to an engine. The assembly 10 may include a housing 12 that may be carried by the fuel tank, with at least a portion of the housing extending into an interior of the fuel tank. The housing 12 may be fixed to the fuel tank, such as by welding or otherwise sealing a mounting flange 14 of the housing 12 to a fuel tank wall. The housing 12 may be formed of any suitable material and may carry or be associated with one or more fuel system components. In at least some implementations, the housing 12 carries a fuel pump 16 which may be carried in a chamber 18 (a portion of which is cut-away in FIG. 1 to show the fuel pump within) formed in the housing 12, and other components like a fuel level sender (not shown), and a fuel pressure regulator 20 may also be provided.

The fuel pump 16 may be any suitable device to take in fuel from the fuel tank (or another source) and deliver it under pressure to an engine to support operation of the engine. The fuel pump 16 may include an electric motor that drives a pumping element and to which electrical power is provided, such as by a power wire (not shown) and a ground wire 22 routed through or to the housing 12. The pumping element may include an impeller, gerotors, meshed gears or other liquid pumping device(s), and may be of conventional construction. Suitable fuel pumps are disclosed in U.S. Pat. Nos. 7,318,422 and 6,547,515, the disclosures of which are incorporated herein by reference in their entirety. Of course, other fuel pumps may be used, if desired. Fuel discharged from the fuel pump 16 may be communicated with the fuel pressure regulator 20.

The fuel pressure regulator 20 may have an inlet in communication with the outlet of the fuel pump 16 and a pressure regulating device that is responsive to limit the maximum pressure of fuel discharged from the fuel pump assembly to an engine. For example, the pressure regulator 20 may include a valve that is opened when the pressure at the inlet is above a threshold pressure. In such an embodiment, the regulator may include a bypass outlet through which at least some fuel is discharged back into the fuel tank when the valve is open. In this regard, the function of the pressure regulator 20 may be in accordance with known fuel pressure regulators, such as disclosed in U.S. Pat. No. 5,873,349, the disclosure of which is incorporated by reference herein in its entirety, and other pressure regulators.

In the implementation shown in FIGS. 1-3, the pressure regulator 20 includes a body 24, and at least a portion of the body is formed from an electrically conductive material, such as a metal material. The pressure regulator 20 may be at least partially received in a chamber or pocket 26 of the housing 12 and the electrically conductive portion of the body 24 may be accessible from the outside of the pocket 26. In at least some implementations, the conductivity of the electrically conductive portion of the body 24 may be between $1.2 \times 10^3$ and $6.3 \times 10^7$ Siemens/meter, and representative materials that may be used include carbon and silver. The pressure regulator 20 may be captured in the pocket 26 by a retainer 30 that holds the regulator 20 in position within the pocket 26, or otherwise with respect to the housing 12.

The retainer 30 is shown separately in FIGS. 4-8 and may include at least one connection feature adapted to be coupled to the housing 12 or another structure to hold the retainer 30 in place with respect to the regulator 20 once assembled. In the implementation shown, two connection features are providing and are defined by a pair of spaced apart flanges 32 adapted to provide a friction, interference and/or snap fit with the housing 12. As shown, the housing 12 includes outwardly extending tabs 34 and the flanges 32 include openings 36 through which the tabs 34 are received when the retainer 30 is assembled onto the housing 12. The openings 36 may each be defined in part by a shoulder 38 against which the tabs 34 overlap and engage to prevent inadvertent removal of the retainer 30 from the housing 12. The distance between the shoulders 38 may be less than the maximum distance between outer surfaces of the tabs 34, and the flanges 32 may be outwardly flexed to pass over the tabs 34 when the retainer 30 is installed. When the shoulders 38 pass the tabs 34, the tabs 34 are received within the openings 36 and the resilient nature of the flanges 32 causes them to return to or toward their unflexed states so that the tabs 34 overlap the shoulders 38 and hold the retainer 30 on the housing 12. Of course, the housing 12 could have openings and the retainer could have tabs or other projections that are received within the openings to couple the retainer to the housing, or the housing and retainer could have some other combination of tabs and openings. Or, some other feature(s) may be provided to couple the retainer to the housing, including mechanical fastener or connection like a clip or screw, and/or an adhesive or weld.

To capture the regulator 20 between the retainer 30 and housing 12, the retainer 30 includes a body 40 that spans and interconnects the spaced apart flanges 32 and has at least a portion that overlies and may engage and bear on the body 24 of the regulator 20, to securely hold the regulator 20 in position and defining a retaining feature of the retainer 30. The retainer 30 generally and its body 40 may include one or more beams 42, cross members 44, openings 46 and other features to give it sufficient rigidity and strength, to accommodate the shape of the regulator body 24, and to reduce material needed to form the retainer 30.

The retainer 30 may also include a grounding feature 50. The grounding feature may facilitate electrically grounding the pressure regulator 20. In the implementation shown, to electrically connect the regulator 20 to an electrical ground, the grounding feature 50 traps and electrically engages the ground wire 22 against the regulator body 24. If the ground wire 22 is insulated, a portion of its insulation 51 may be removed, as best shown in FIGS. 1 and 2, to engage an exposed portion 53 of the wire 22 itself to the regulator body 24. This may prevent the build-up of a static or other electric charge in the fuel pressure regulator 20.

In at least some implementations, the grounding feature 50 includes a latch 52 that, in its first or open position, permits the ground wire 22 to be positioned adjacent to the retainer 30 and regulator body 24, and in its second or closed position, clamps or traps the ground wire 22 against an electrically conductive portion of the regulator body 24. To hold the ground wire 22 in position, the retainer 30 may include a wire holder 54, which may simply be a channel, groove or other feature in which a portion of the wire 22 may be routed or received, and which may be sized to frictionally engage the insulation 51 that may be provided on at least part of the ground wire 22. The holder 54 may also include a stop surface 55, such as a ridge or protrusion, adapted to engage an edge of the insulation 51 and limit sliding movement of the wire 22 within the holder 54. This may position the exposed wire section 53 at a desired position relative to the regulator body 24 and provide a means for repeatable location of the exposed wire section in assembly.

The latch 52 may be defined by an arm, which is shown as being cantilevered from the retainer body 40, but need not be cantilevered. At least a portion of the latch arm 52 is moveable relative to the retainer body 40 from an open position with at least a portion spaced from the regulator body 24 to a closed position wherein that portion is closer and may be immediately adjacent to the regulator body 24. The arm 52 may be pivoted relative to the retainer body 40, such as by a living hinge 56, or the arm may sufficiently flexible to move between its open and closed positions simply by flexing. In this manner, and in at least some implementations, the grounding feature may be formed from the same piece of material and may be integrally joined with the retainer such that it is not a separate component that must be handled and installed separately at any time after the retainer is formed.

The latch 52 may include a retaining feature that engages a catch 58 (FIG. 6) defined on an adjacent structure, such as the retainer 30, regulator 20 or housing 12. In the implementation shown, the catch 58 is carried by the retainer body 40 and is adapted to provide an interference or snap-fit with a portion of the latch 52 to hold the latch 52 in its closed position. The retaining feature in the implementation shown includes a hook 60 at a free end 62 of the latch 52 (and may also be considered as including the catch 58). Engagement of the hook 60 and catch 58 or other retaining features) may be confirmed by one or more of visual inspection, audible feedback (e.g. a "click" or other sound emitted upon locking or engagement) or tactile feedback, where the snap-fit may be felt by an installer. To facilitate manipulation of the latch 52 and engagement with the catch 58, the latch 52 may include an enlarged portion 61 at or near its end 62.

Accordingly, in assembly, the pressure regulator 20 is placed within its pocket 26 in the housing 12. The retainer 30 is then positioned over the regulator body 24 with the flanges 32 generally aligned with the tabs 34. When the retainer 30 is advanced toward the regulator 20, the tabs 34 interact with the flanges 32 until the tabs 34 are received within the openings 36 in the retainer 30. In this position, the retainer 30 is securely coupled to the housing 12 and the regulator 20 is trapped between the retainer 30 and housing 12. At some point in the installation process, the ground wire 22 may be routed in or otherwise associated with the wire holder 54, or simply positioned between the latch 52 and regulator 20. An electrically conductive or exposed portion 53 of the wire 22 may be provided in the area of the latch 52, and between the latch 52 and regulator body 24. Then, the latch 52 may be moved to its second or closed position where a portion of the latch 52 e.g. inside surface 63—FIGS. 4, 6 and 8) traps the exposed section 53 of the ground wire 22 against the regulator body 24 to electrically connect the regulator body 24 to electrical ground. This position of the latch 52 may be securely maintained by engagement of the latch 52 with the catch 58, as previously noted. This defines the fully installed position of the retainer 30.

In this installed position, the retainer 30 both maintains the position of a component (e.g. the pressure regulator 20) and couples that component to electrical ground (e.g. by contact with ground wire 22). And the coupling to electrical ground may be done without the need for metal springs or metal fasteners, and can even be done by a component integrally formed from the same piece of material as the rest of the retainer. Further, the electrical grounding may be done in a quick and secure manner that may be visually confirmed during and after installation. That is, the electrically grounding of the component is visible from outside of the component and retainer after assembly. Further, the latch and catch arrangement may provide visual, audible and/or tactile confirmation to an installer that the catch has been engaged and the latch is secured in its second or closed position.

Figure 9:
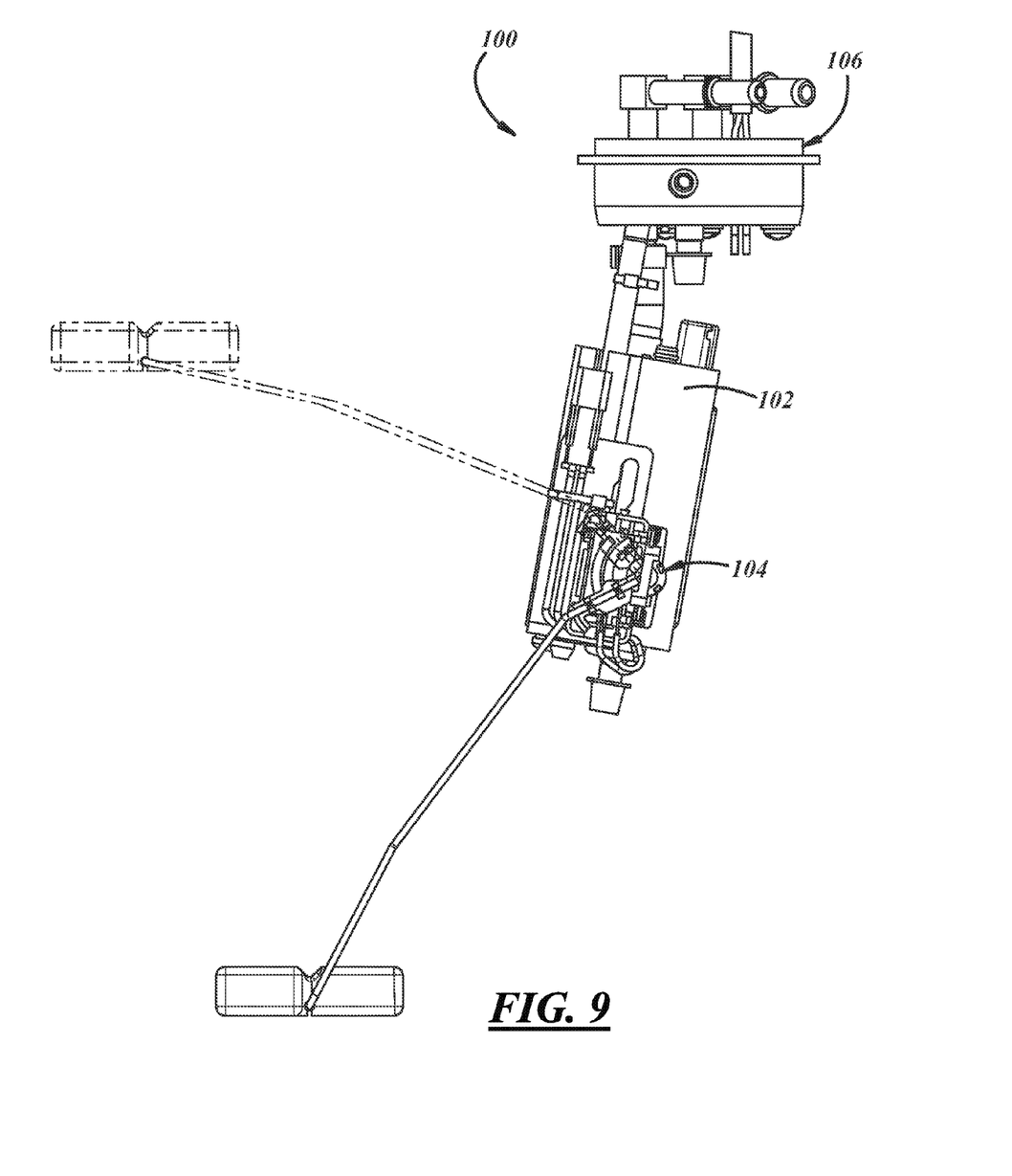
FIG. 9 illustrates one implementation of a fuel pump module.
Figure 10:
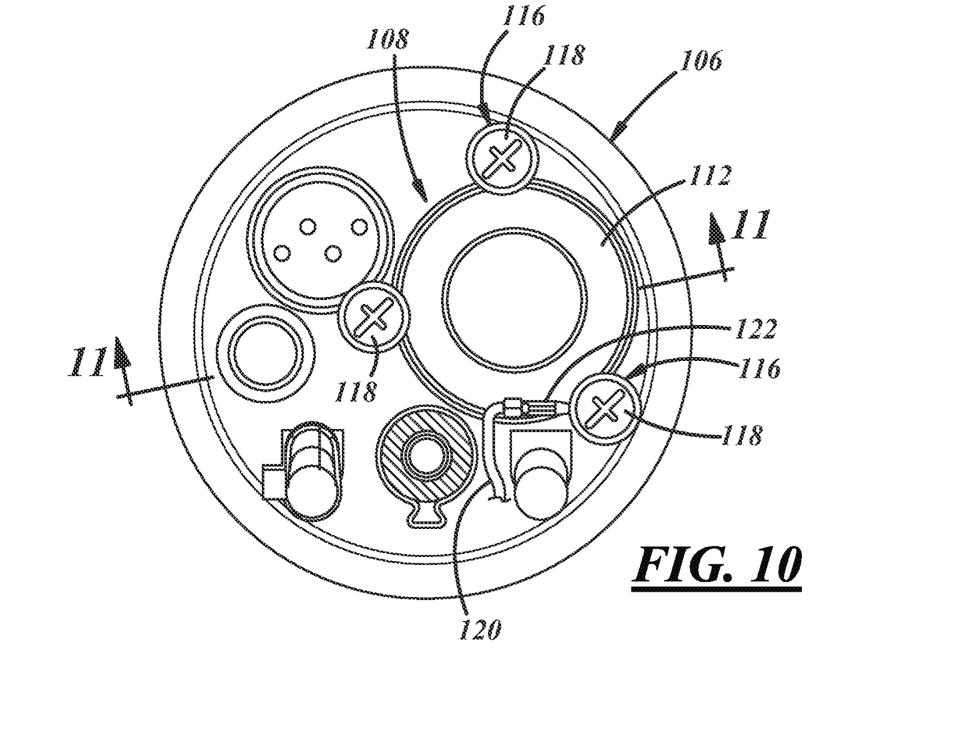
FIG. 10 is a bottom view of a mounting flange of the module of FIG. 9.
Figure 11:
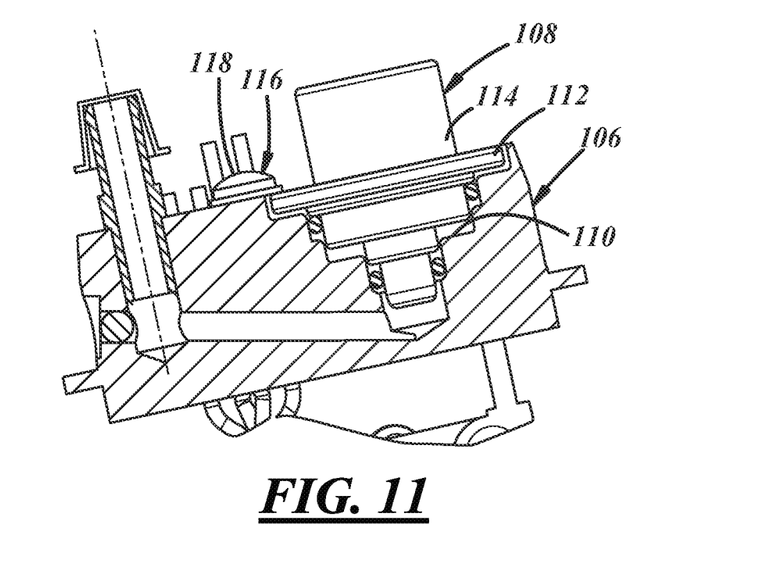
FIG. 11 is a sectional view taken generally along line 11-11 of FIG. 10.

FIG. 9 illustrates another implementation of a fuel pump module 100 having a pump received within a canister 102, a fuel level sensor 104 carried by the canister, and a mounting flange 106 adapted to be connected to a fuel tank to mount the module 100 to the fuel tank. As shown in FIGS. 10 and 11, a fuel pressure regulator 108 may be mounted at least partially within a pocket 110 in the mounting flange 106 or otherwise carried by the mounting flange. A radially outwardly extending rim 112 of a housing 114 of the fuel pressure regulator 108 may overlie a portion of the mounting flange 106. One or more retaining features may be used to maintain the regulator 108 in position relative to the mounting flange. In the implementation shown, the retain features include screws 116, and three screws are used, relatively evenly spaced about the circumference of the rim 112. Of course, retainers other than screws may be used, if desired. Each screw 116 has a head 118 that partially overlies the rim 112 and a portion of the mounting flange 106 to trap the rim against the mounting flange. To electrically ground the regulator 108, a wire 120 for the fuel pump may be held against the regulator 108 by one of the screws 116. In this way, a portion of one or more screws may define a grounding feature and define part of the ground path between the wire and regulator (or other fuel system component). To facilitate connecting the wire 120 to the screw 116, the wire may include a terminal 122 (FIG. 10) trapped by or otherwise engaged with the screw, if desired.

Figure 12:
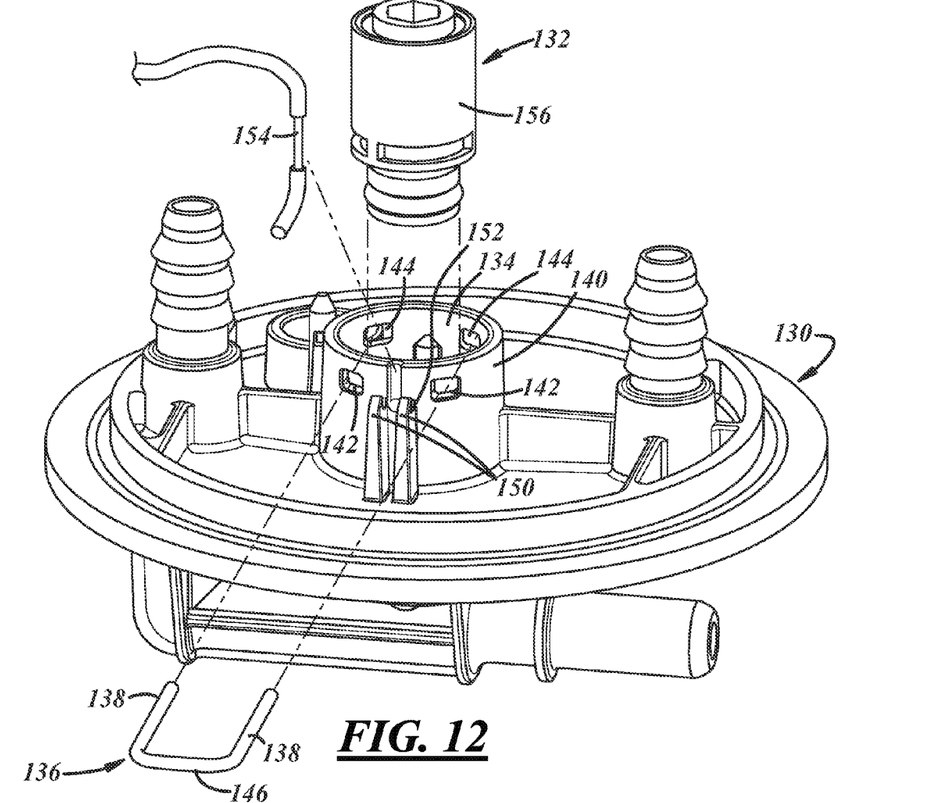
FIG. 12 is a perspective view of a mounting flange which may be used with a fuel pump module and showing a fuel pressure regulator with retaining and grounding features in an exploded position.
Figure 13:
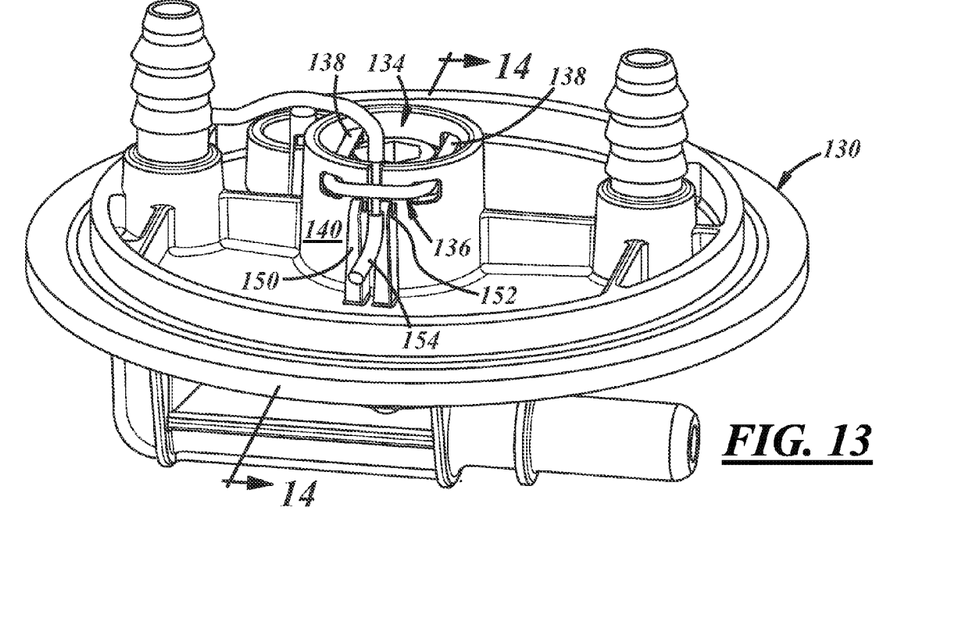
FIG. 13 is a view similar to FIG. 12 with the retaining and grounding features in an installed position.
Figure 14:
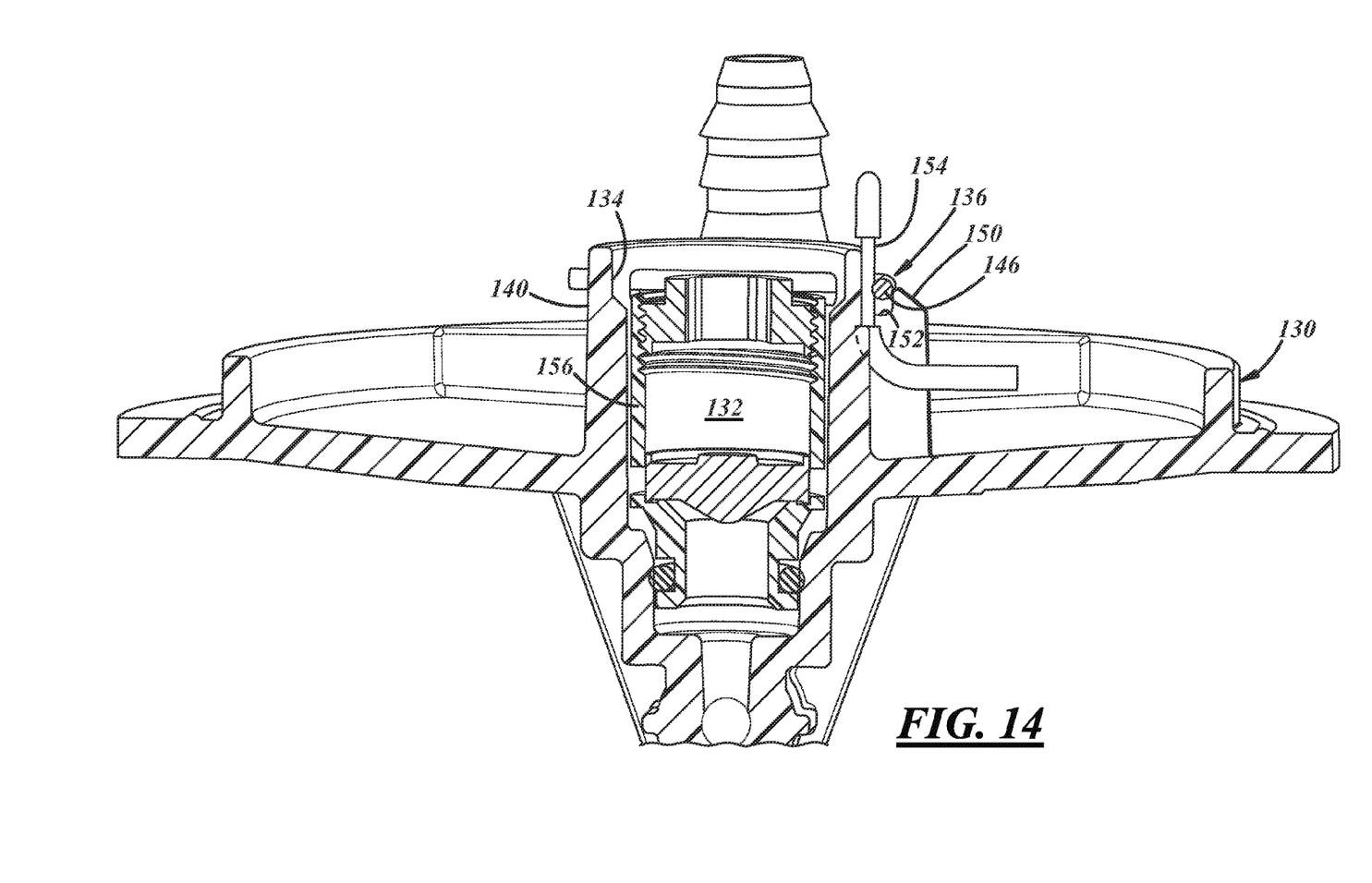
FIG. 14 is a sectional view taken generally along line 14-14 in FIG. 13.

FIGS. 12-14 illustrate another mounting flange 130. While the mounting flange 130 shown in FIGS. 12-14 does not match that shown in FIG. 9, the general construction and arrangement described below may be incorporated into other mounting flanges, or other structures of the module(s), such that a particular design of the module or its components is not required.

As shown in FIGS. 12-14 the regulator 132 may be received within a pocket 134 formed in or otherwise carried by the mounting flange 130. The pocket 134 could otherwise be formed in or carried by the canister of a module, a bracket, or some other structure. A retaining feature is associated with the pocket 134 and adapted to engage or overlie a portion of the regulator 132 to retain the regulator within the pocket.

In this implementation, the retaining feature includes a clip 136. The clip 136 is generally U-shaped as shown, although other shapes may be used. The U-shaped clip 136 includes two spaced apart legs 138 that may be received through sets of opposed openings in a sidewall 140 of the mounting flange 130 that defines the pocket 134. Each set of openings may include an entrance opening 142 and an exit opening 144. Each leg 138 may initially be received through its associated entrance opening 142 and extend across the pocket 134 and through the exit opening 144. In this way, each leg 138 crosses the pocket 134 and overlies the regulator 132 to retain the regulator within the pocket. The legs 138 are joined at a base 146 that, in assembly, is located outboard of the pocket 134. The clip 136 may be formed from a metal material and play aid in electrically grounding the regulator 132, as will be described below.

In the implementation shown, the base 146 is trapped against an outside surface of the sidewall 140 of the pocket and held there by one or more tabs 150. The tab(s) 150, sidewall 140 and pocket 134 generally may be formed integrally with and from the same piece of material as the mounting flange 130, or other module structure/component. The tabs 150 may define a slot 152 into which the base 146 is snap-fit or otherwise received when in its installed position, as shown in FIGS. 13 and 14.

As also shown in FIGS. 13 and 14, the base 146 may define a grounding feature that electrically grounds the fuel pressure regulator. As shown, the base 146 engages a wire 154, and specifically, a portion of the wire without insulation. The legs 138 engage the housing 156 of the fuel pressure regulator 132, which is formed from metal. Therefore, the assembly provides contact between the metal clip 136 and both the metal housing 156 of the regulator 132 and the wire 154, to effectively electrically couple the wire to the regulator and thereby electrically ground the regulator. In this way, the clip may define both retaining and grounding features, if desired. Of course, the flange 130 and/or clip 136 and/or regulator housing 156 could be formed from an electrically conductive plastic or metal. In one form, to ground the regulator 132 the wire 154 is welded (such as by ultrasonic welding) to an electrically conductive plastic structure, and the regulator 132 also engages that conductive plastic structure. For example, the stripped wire portion shown in FIG. 13 could be welded to the sidewall 140, although in that embodiment, it need not be.

Figure 15:
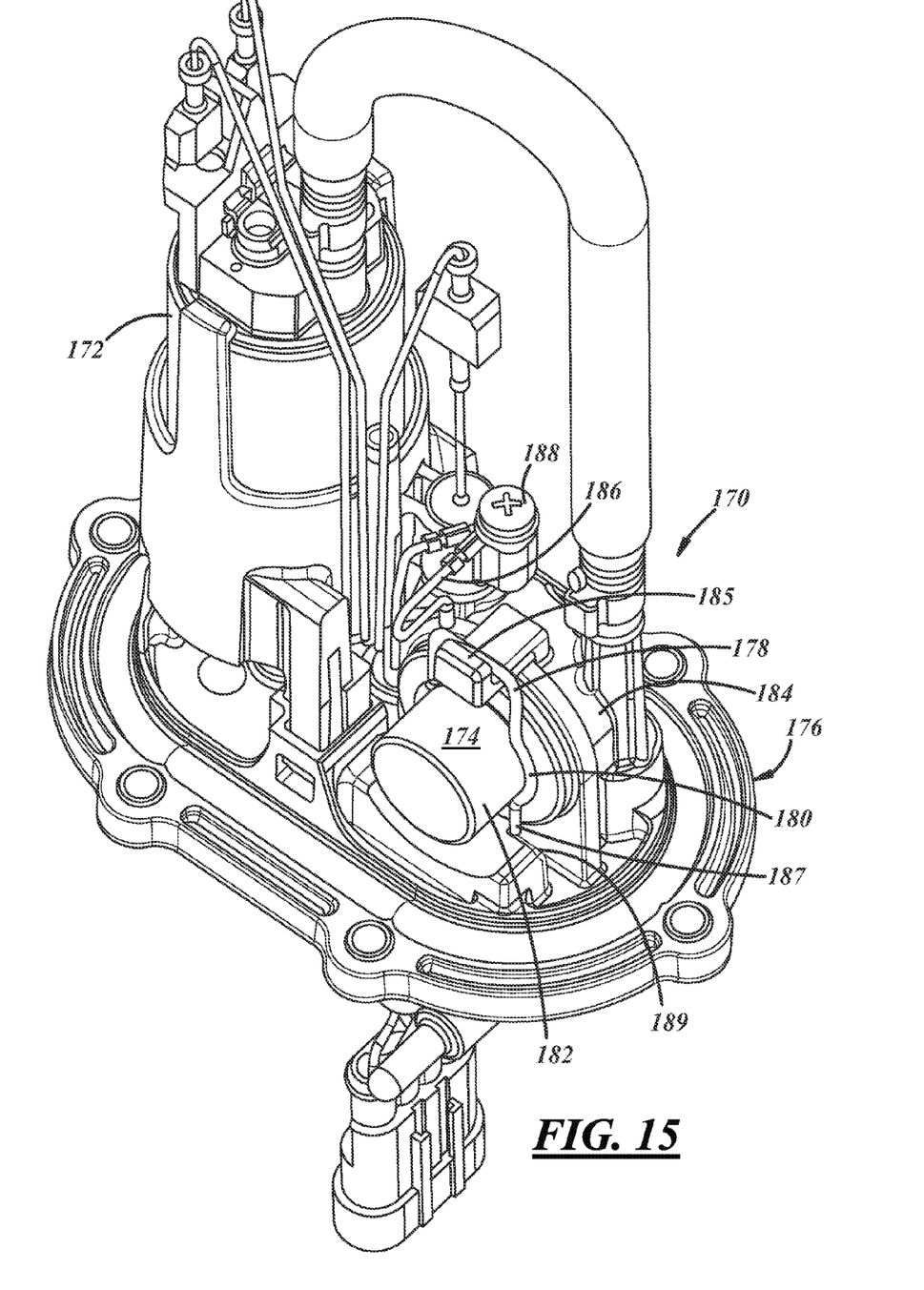
FIG. 15 is a perspective view of another fuel pump module.

FIG. 15 illustrates another fuel pump module 170. This module 170 is adapted to be inserted into or near a bottom of the fuel tank, and includes a fuel pump 172 and fuel pressure regulator 174 that are carried by a mounting flange 176. Like the embodiment shown in FIGS. 12-14, the regulator retaining feature may include a clip 178. The clip 178 may be generally U-shaped with a pair of legs 180 that overlap spaced apart portions of the regulator housing 182 to hold the regulator 174 in position relative to a structure or pocket 184 of the mounting flange 176. A tab 185 may retain the clip 178 on the mounting flange 176; and the free ends 187 of the legs may engage a shoulder or stop surface 189 of the mounting flange.

To electrically ground the regulator 174, the clip 178 may engage a wire 186 and the wire and/or clip may engage the regulator housing 182. Or, a wire terminal may be coupled to the clip 178, or trapped between the clip 178 and regulator housing 182. The wire 186 may be retained by a screw 188 at its other end.

Figure 16:
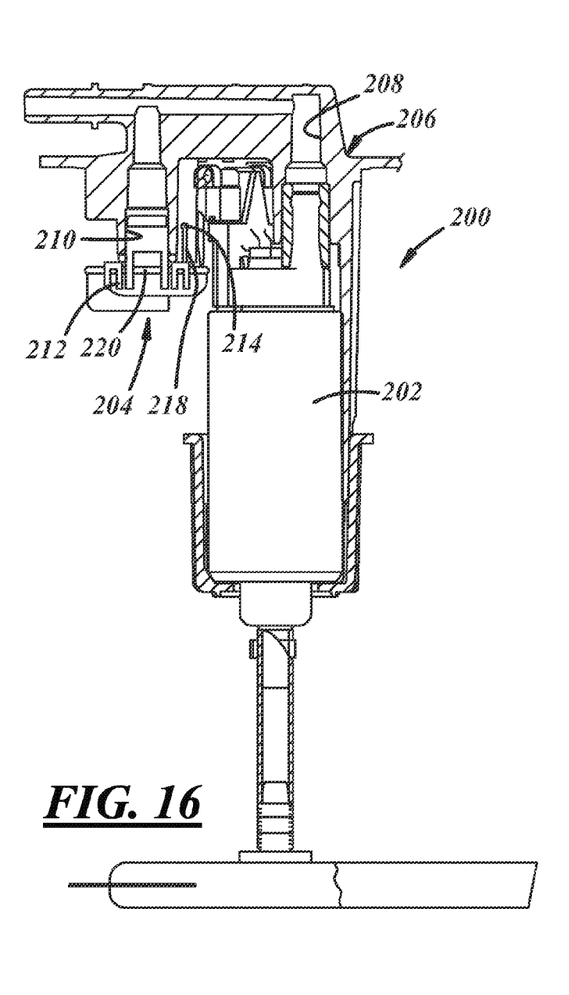
FIG. 16 is sectional view of a fuel pump module.
Figure 17:
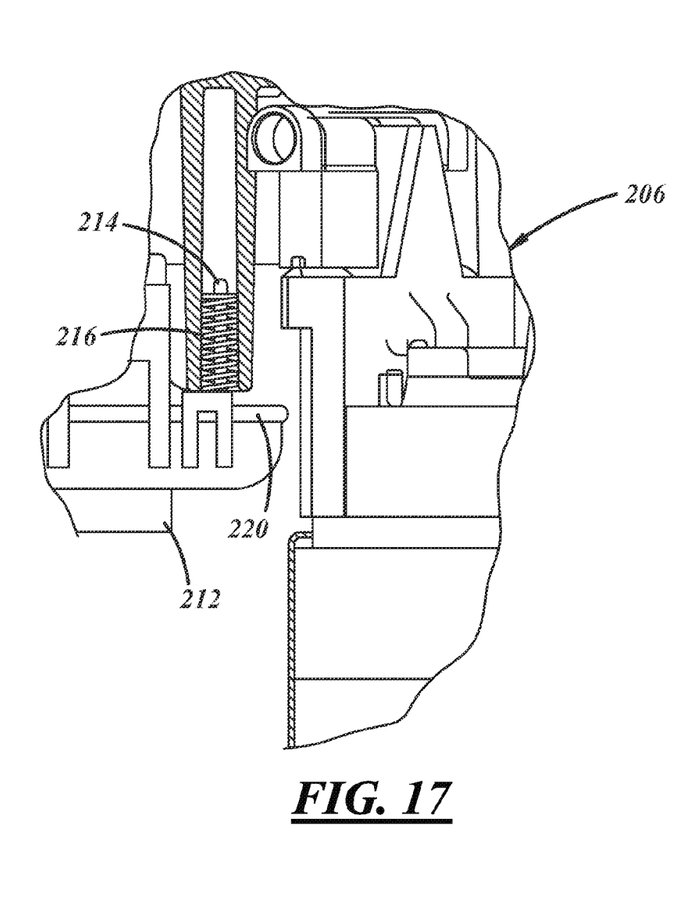
FIG. 17 is an enlarged, fragmentary sectional view of a portion of the module shown in FIG. 16.

A fuel pump module 200, as shown in FIG. 16, includes a fuel pump 202 and fuel pressure regulator 204 carried by a mounting flange 206, and communicated with each other by passages 208 formed within the mounting flange. In this implementation, the pressure regulator 204 is at least partially received within a pocket 210 formed in the mounting flange 206. The retaining feature that holds the regulator 204 in position on the mounting flange 206 may be of any type, including by way of a non-limiting example, a snap-fit plastic retainer 212. A stripped portion of a grounding wire 214 may be retained on the flange 206, such as by being pressed into a slot 218 provided in the flange. Of Course, the wire 214 may be retained in other ways and by other structures. A grounding feature, which in the illustrated embodiment includes a metal spring 216 (FIG. 17), is located between the wire 214 and the regulator housing 220 (e.g. a rim of the housing). At one end, the spring 216 engages the ire 214 and at its other end, the spring engages the regulator housing 220. In this way, the housing 220 is electrically coupled to the wire 214 and grounded. The spring 216 may accommodate a wider range of tolerances in production runs of these components, and ensure that the coupling between the wire and regulator housing is maintained in use.

While the forms of the invention herein disclosed constitute presently preferred embodiments, many others are possible. It is not intended herein to mention all the possible equivalent forms or ramifications of the invention. For example, while the retainer has been described with regard to a pressure regulator, the retainer could be used with other components, such as a fuel pump (which, to be clear, is just one example of a component). It is understood that the terms used herein are merely descriptive, rather than limiting, and that various changes may be made without departing from the spirit or scope of the invention.

The invention claimed is:

1. A retainer for a fuel system component having an electrically conductive portion accessible from an exterior of the component, the retainer comprising:
   a housing having a pocket receiving at least in part the fuel system component;
   a clip configured to retain the fuel system component in the pocket;
   an electrically conductive resilient spring separate from the clip and the housing, engaging an electrically conductive ground wire and resiliently bearing on the electrically conductive portion of the fuel system component; and
   wherein the fuel system component is grounded through a path including the electrically conductive portion of the fuel system component, the resilient spring and the ground wire.

2. The retainer of claim 1 wherein the electrically conductive spring is a resilient metal spring.

3. The retainer of claim 1 wherein the electrically conductive portion has a conductivity between $1.2 \times 10^3$ and $6.3 \times 10^7$ Siemens/meter.

4. A retainer for a fuel system component having an electrically conductive portion accessible from an exterior of the component comprising:
   a housing having a pocket receiving at least in part the fuel system component;
   a retainer configured to retain the fuel system component in the pocket and having a latch movable between an open position wherein an electrically conductive ground wire is not trapped against the electrically conductive portion of the fuel system component and a closed position wherein the ground wire is trapped against the electrically conductive portion of the fuel system component.

5. The retainer of claim 4 wherein the retainer also comprises a body that engages the fuel system component to maintain the location of the fuel system component in the pocket and a catch, and wherein the latch is carried by the body and engageable with the catch to maintain the latch in its closed position.

6. A fuel pump assembly, comprising:
   a housing having a pocket;
   a fuel pressure regulator carried by the housing and having a body with at least a portion of the body received in the pocket and at least a portion of the body being electrically conductive; and
   an electrically conductive U-shaped retainer clip with spaced apart legs connected to the housing and holding the fuel pressure regulator relative to the housing and engaging the electrically conductive portion of the body; and
   the clip engaging an electrically conductive ground wire to electrically connect the ground wire with the electrically conductive portion of the body.

7. The assembly of claim 6 wherein the retaining clip is an electrically conductive metal clip.

8. The assembly of claim 7 wherein the housing comprises a tab retaining the U-shaped clip in engagement with the housing.

9. A fuel pump assembly, comprising:
   a housing having a pocket;
   a fuel pressure regulator carried by the housing and having a body with at least a portion of the body received in the pocket and at least a portion of the body being electrically conductive; a retainer connected to the housing and holding the fuel pressure regulator in position relative to the housing, to couple a ground wire with the electrically conductive portion of the body;
   the retainer includes a screw that traps a portion of the wire against the electrically conductive portion of the body; and
   the screw engages the housing and has an enlarged head that overlies a portion of the body to maintain said at least a portion of the body within the pocket.

10. The assembly of claim 6 wherein the housing includes a tab and the clip engages the tab to maintain the clip engaged with the housing and the wire.

11. The retainer of claim 1 wherein the electrically conductive resilient spring is a coil spring.

12. The retainer of claim 1 wherein the electrically conductive resilient spring is a compression spring.

13. The retainer of claim 1 wherein the electrically conductive resilient spring is a compression coil spring.

* * * * *